(No Model.)

W. R. SANTLEY.
DEAD PULLEY.

No. 329,679. Patented Nov. 3, 1885.

WITNESSES
W. Engel
Geo. W. King

INVENTOR
William R. Santley
By Leggett & Leggett
ATTORNEYS

United States Patent Office.

WILLIAM R. SANTLEY, OF WELLINGTON, OHIO.

DEAD-PULLEY.

SPECIFICATION forming part of Letters Patent No. 329,679, dated November 3, 1885.

Application filed August 13, 1883. Renewed May 18, 1885. Serial No. 165,927. (No model.)

*To all whom it may concern:*

Be it known that I, WILLIAM R. SANTLEY, of Wellington, in the county of Lorain and State of Ohio, have invented certain new and useful Improvements in Dead-Pulleys; and I do hereby declare the following to be a full, clear, and exact description of the invention, such as will enable others skilled in the art to which it pertains to make and use the same.

My invention relates to improvements in dead-pulleys; and it consists of certain features of construction and in combination of parts hereinafter described, and pointed out in the claims.

Figure 1:
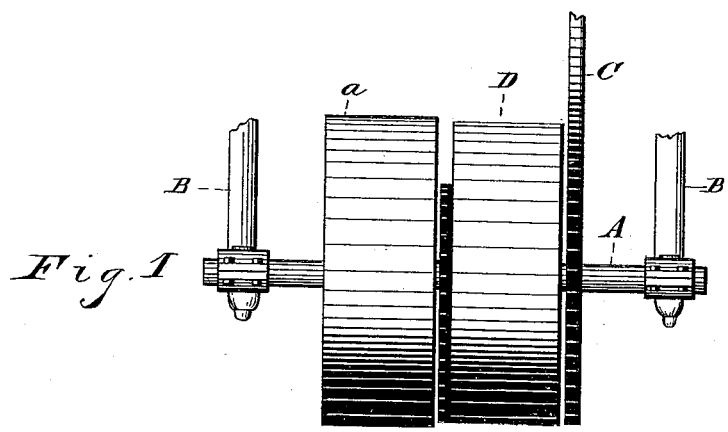
Figure 2:
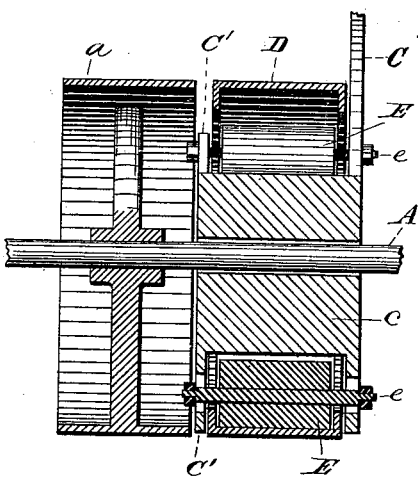
Figure 3:
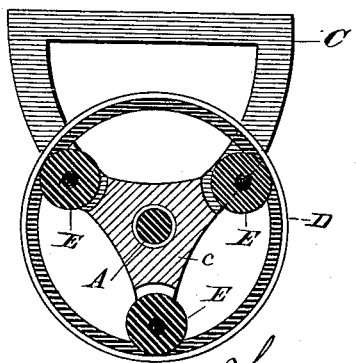
Figure 4:

In the drawings, Figure 1 is a side elevation of my improved dead-pulley. Fig. 2 is a vertical sectional view of the same. Fig. 3 is a vertical cross-section. Fig. 4 is a view in detail.

A represents a shaft to which is secured the live-pulley $a$. The shaft, as shown, is supported by the hangers B, but may have boxes supported in any other manner desired.

C is a bracket with a suitable hub, $c$, through which the shaft A may pass, but without contact with the hub. The other end of the hub may be provided with arm C', and between these arms and the bracket are supported the rollers E, that in turn support the rim or dead-pulley D. These rollers revolve preferably on the spindles or axles $e$, that pass through slots running radially in the said arms and in the bracket, and may be secured on the outer ends of the spindles by nuts, as shown. By loosening these nuts and by means of the said slots the rollers may be adjusted in a radial direction. These rollers may be of any number desired, and the bracket, hub, and arms may be modified in a variety of ways without departing from the spirit of my invention. For light work and where the rim D is narrow, the hub $c$ and the arms C' may be omitted, and in place of the spindle $e$ the rollers may be supported by a stud, F. (See Fig. 4.) This stud or pin, as shown, is provided with a screw end, $f$, that passes through the slot in the bracket, and is secured with a nut outside.

As shown in Fig. 2, the rim D is provided with inside flanges that embrace the rollers endwise, and thus guide the said rim. This particular construction, however, is not essential. A single rib on the rim D, operating in a groove on the rollers, or any of the well-known devices, may be used for guiding the said rim. This rim or dead-pulley should be somewhat less in size than the live-pulley, so that the belt may relax when it is not in use. In such a case the relative positions of the live and dead pulleys should be such that their respective faces on the heading side of the belt will be about flush with each other, so that the belt may be easily shifted from one pulley to the other.

The bracket, hub, and arms may be, if so desired, made in halves and bolted together for convenience in placing the parts around the shaft; or a slot might be left leading from the outside to the central chamber, through which the shaft might pass. The rim, also, may be made in halves, if so desired, and if the pulleys are near together the rim may be flexible, if preferred.

What I claim is—

1. The combination, with a shaft having a live-pulley thereon, of a dead-pulley loosely encircling the shaft alongside of the live-pulley and supported by rollers located between the axis and circumference of the rim and adapted to revolve thereon, substantially as described.

2. The combination, with a shaft having a live-pulley thereon, of a dead-pulley loosely encircling the shaft alongside of the live-pulley and provided with annular flanges on opposite sides, the said dead-pulley being supported by rollers located between it and the shaft, substantially as described.

3. The combination, with a shaft and live-pulley, of a dead-pulley encircling the shaft alongside of the live-pulley, rollers for supporting the pulley, and devices for holding the rollers in position within the pulley.

4. The combination, with a live-pulley, of a contiguous dead-pulley of smaller diameter and supported by rollers located between the periphery and axis of the same, and adapted, by means of the adjustability of the supporting-rollers, to be placed with its face flush with the face of live-pulley on the leading side of the belt, substantially as and for the purpose set forth.

5. In a dead-pulley, the bracket C and the arms C', provided with slots and adapted to support the rollers E and render them adjustable, substantially as shown and described.

6. The combination of the bracket C, the hub c, the arm C', the rollers E, and the rim D, substantially as and for the purpose shown and described.

In testimony whereof I sign this specification, in the presence of two witnesses, this 8th day of August, 1883.

WILLIAM R. SANTLEY.

Witnesses:
GEO. W. KING,
ALBERT E. LYNCH.